United States Patent
Yamazaki

(10) Patent No.: US 8,019,518 B2
(45) Date of Patent: Sep. 13, 2011

(54) VEHICLE BEHAVIOR CONTROL DEVICE

(75) Inventor: Yoshinobu Yamazaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 255 days.

(21) Appl. No.: 12/219,928

(22) Filed: Jul. 30, 2008

(65) Prior Publication Data

US 2009/0037053 A1 Feb. 5, 2009

(30) Foreign Application Priority Data

Aug. 1, 2007 (JP) ................................. 2007-201134

(51) Int. Cl.
*G06F 17/00* (2006.01)
*B60K 28/16* (2006.01)

(52) U.S. Cl. ............... 701/51; 701/41; 701/45; 180/197

(58) Field of Classification Search .................... 701/41, 701/42, 51, 52, 61, 60, 71, 78, 83, 87, 89, 701/1, 53, 91, 69; 180/6.2, 6.3, 118, 119, 180/197, 204, 234, 242, 243, 245, 246, 201, 180/15, 345; 116/36; 315/80

See application file for complete search history.

(56) References Cited

U.S. PATENT DOCUMENTS

| 6,219,609 | B1 * | 4/2001 | Matsuno et al. | 701/72 |
| 7,263,424 | B2 | 8/2007 | Motoyama | |
| 7,774,138 | B2 * | 8/2010 | Matsui | 701/301 |
| 2006/0086556 | A1 * | 4/2006 | Matsuno | 180/245 |

FOREIGN PATENT DOCUMENTS

| JP | 2006-29460 | 2/2006 |
| JP | 2006-117113 | 5/2006 |

* cited by examiner

*Primary Examiner* — James Trammell
*Assistant Examiner* — Muhammad Shafi
(74) *Attorney, Agent, or Firm* — Smith, Gambrell & Russell, LLP

(57) ABSTRACT

A basic-additional-yaw-moment setting section sets a basic additional yaw moment and determines the polarity of the basic additional yaw moment on the basis of a steering-wheel angle, a yaw rate, and a vehicle speed. A left-right driving-force distribution controller sets the driving-force distribution with respect to left and right driving wheels on the basis of the basic additional yaw moment and the polarity of the basic additional yaw moment, and adjusts the driving-force distribution when a vehicle drive control operation signal is output from a vehicle drive control unit. Specifically, the left-right driving-force distribution control section adjusts the driving-force distribution such that the polarity of the basic additional yaw moment is in the same direction as that of a yaw moment applied by the vehicle drive control unit.

4 Claims, 12 Drawing Sheets

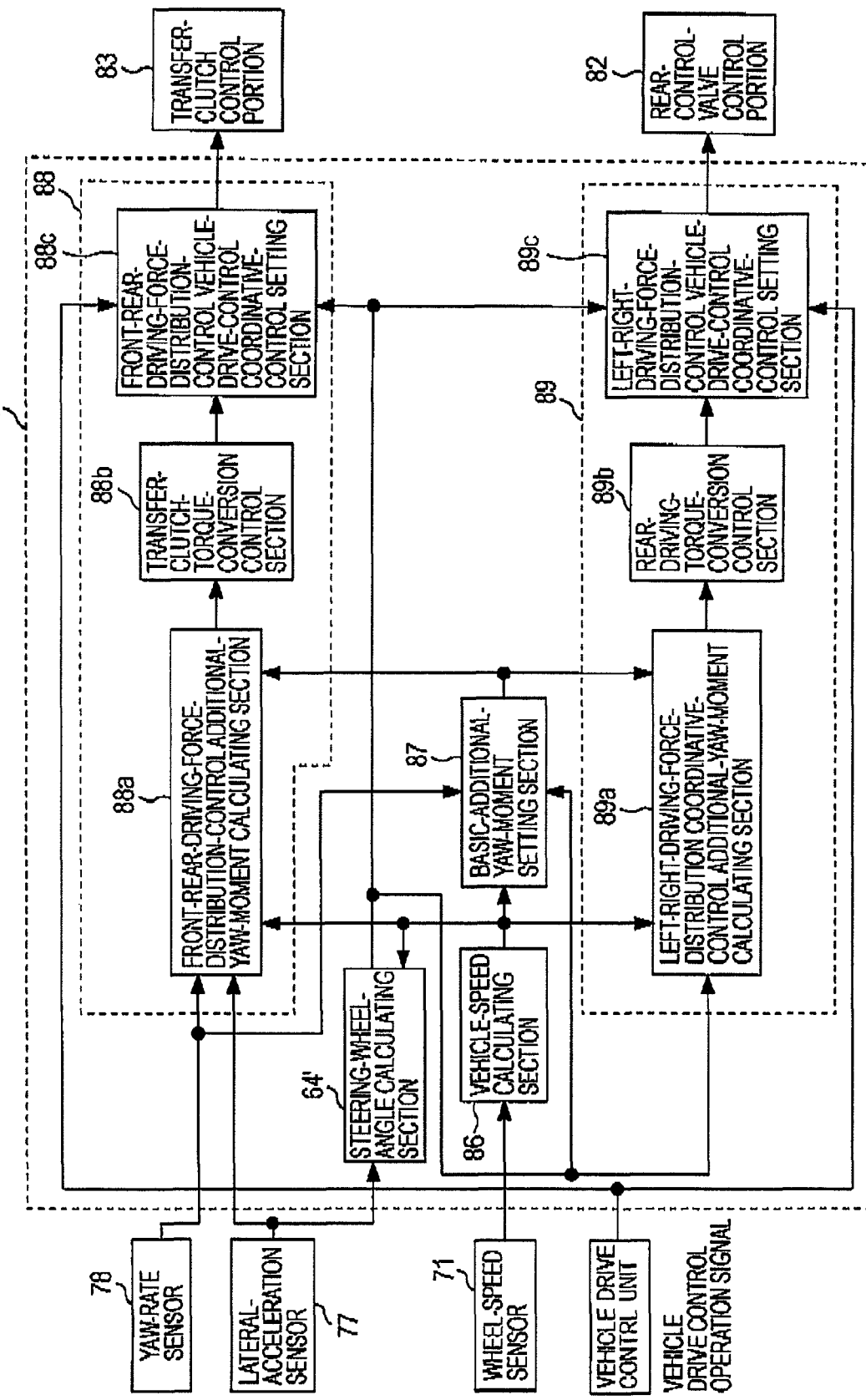

VEHICLE BEHAVIOR CONTROL DEVICE

CROSS REFERENCES TO RELATED APPLICATIONS

The disclosure of Japanese Patent Application No. 2007-201134 filed on Aug. 1, 2007 including the specifications, drawings, and abstracts are incorporated by references herein.

BACKGROUND OF THE INVENTION

1. Field of the Invention

The present invention relates to a vehicle behavior control device equipped with sideslip prevention controlling means that prevents a sideslip by controlling the vehicle and driving-force-distribution controlling means that controls driving-force distribution with respect to at least left and right driving wheels.

2. Description of the Related Art

In recent years, there have been proposed and put in practical use various technologies for vehicle-behavior control, which include braking-force control and driving-force distribution control. Specifically, driving-force distribution control involves controlling the driving force distributed to the front and rear wheels in addition to actively controlling the driving force distributed to the left and right driving wheels, and thus allows for enhanced stability and yawing performance of the vehicle.

For example, Japanese Unexamined Patent Application Publication No. 2006-29460 discloses a technology for controlling the driving-force distribution between the rear left and right wheels. In this technology, feedback control with respect to a difference between left and right wheel speeds is performed first. Specifically, this feedback control includes determining a target wheel-speed difference between the rear left and right wheels on the basis of the steering-wheel angle and the vehicle speed, and setting a first basic control amount for a left-right driving-force distribution mechanism such that the actual wheel-speed difference between the rear left and right wheels matches the target wheel-speed difference. Moreover, yaw-rate feedback control is performed, which includes determining a target yaw rate on the basis of the vehicle speed, the yaw rate, and the steering-wheel angle, and setting a second basic control amount for the left-right driving-force distribution mechanism such that the actual yaw rate matches the target yaw rate. Then, a value obtained by multiplying the first basic control amount by a predetermined gain is added to a value obtained by multiplying the second basic control amount by a predetermined gain, so as to control the driving-force distribution with respect to the rear left and right wheels. In this manner, an oversteer condition and an understeer condition of the vehicle can be suppressed.

Japanese Unexamined Patent Application Publication No. 2006-117113 discloses a technology for appropriately controlling a vehicle in various running conditions by performing front-rear driving-force distribution control and rear-left-right-wheel driving-force distribution control to the maximum effect. First, in this technology, a front-rear-driving-force-distribution coordinative-control additional yaw moment is determined by multiplying a front-rear-driving-force-distribution-control additional yaw moment by a front-rear-driving-force-distribution coordinative-control gain, and a left-right-driving-force-distribution coordinative-control additional yaw moment is determined by multiplying a left-right-driving-force-distribution-control additional yaw moment by a left-right-driving-force-distribution coordinative-control gain. If the vehicle is determined to be on a high $\mu$ road in a steering and accelerating state, the front-rear-driving-force-distribution coordinative-control gain is set to a low value so as to reduce the control amount by the front-rear driving-force distribution control. If the vehicle is determined to be on a low $\mu$ road, the rear-left-right-wheel driving-force-distribution coordinative-control gain is set to a low value so as to reduce the control amount by the left-right driving-force distribution control. By performing control in this manner, the driving performance can be enhanced at the time when the vehicle is driven on a high $\mu$ road in a situation where the lateral acceleration is high. On a low $\mu$ road, the above-described control can prevent an excessive yaw moment from being produced when the vehicle is steered by a great amount.

However, problems can occur if the left-right driving-force distribution control as disclosed in Japanese Unexamined Patent Application Publication No. 2006-29460 is performed in combination with vehicle drive control for controlling a vehicle for sideslip prevention, such vehicle drive control including controlling of the engine by opening and closing of the throttle valve and fuel cut and controlling of the braking force independently for the four wheels. In detail, in a case where the driver performs a steering operation, such as turning back the steering wheel continuously during slalom driving along a continuous curve or driving on a low $\mu$ road, a yaw moment may undesirably be added by left-right driving-force distribution control in a direction for facilitating an oversteer condition while the oversteer condition is simultaneously being suppressed by vehicle drive control. In that case, the oversteer suppressing performance may deteriorate, or the driving force applied in accordance with the left-right driving-force distribution control may interfere with the braking force, making it difficult to obtain a target braking force and thus deteriorating the oversteer suppressing performance. This phenomenon similarly occurs in Japanese Unexamined Patent Application Publication No. 2006-117113.

SUMMARY OF THE INVENTION

The present invention has been made under such circumstances, and it is an object of the present invention to provide a vehicle behavior control device that can properly suppress an understeer condition and an oversteer condition while preventing interference between left-right driving-force distribution control and vehicle drive control for sideslip prevention even when the left-right driving-force distribution control is performed in combination with the vehicle drive control.

The present invention provides a vehicle behavior control device that includes steering-wheel-angle detecting means configured to detect a steering-wheel angle; yaw-rate detecting means configured to detect a yaw rate; vehicle-speed calculating means configured to determine a vehicle speed; sideslip prevention controlling means configured to prevent a sideslip by controlling a vehicle; and driving-force-distribution controlling means configured to control driving-force distribution with respect to at least left and right driving wheels. The driving-force-distribution controlling means includes additional-yaw-moment setting means configured to set an additional yaw moment to be added to the vehicle and to determine a polarity of the additional yaw moment on the basis of the steering-wheel angle, the yaw rate, and the vehicle speed, and left-right driving-force distribution controlling means configured to set the driving-force distribution with respect to the left and right driving wheels on the basis of the additional yaw moment and the polarity of the additional yaw moment set and determined by the additional-yaw-moment setting means, and to adjust the driving-force distribution when an operation signal for sideslip prevention is output from the sideslip prevention controlling means, the driving-force distribution being adjusted such that the polarity of the additional yaw moment is in the same direction as that of a yaw moment applied by the sideslip prevention controlling means.

According to the vehicle behavior control device of the present invention, when the vehicle drive control for sideslip prevention is in operation, the driving-force distribution controlled in accordance with the left-right driving-force distribution control is adjusted such that the polarity of the yaw moment to be added to the vehicle is in the same direction as that of the yaw moment applied in accordance with the vehicle drive control. Consequently, an understeer condition and an oversteer condition can be properly suppressed while the left-right driving-force distribution control and the vehicle-drive control for sideslip prevention are prevented from interfering with each other even when the left-right driving-force distribution control is performed in combination with the vehicle-drive control.

BRIEF DESCRIPTION OF THE DRAWINGS

FIG. 17 is a functional block diagram of a driving-force distribution control portion according to a second embodiment of the present invention.

DESCRIPTION OF THE PREFERRED EMBODIMENTS

Exemplary embodiments of the present invention will now be described with reference to the drawings.

First Embodiment

Figure 1:
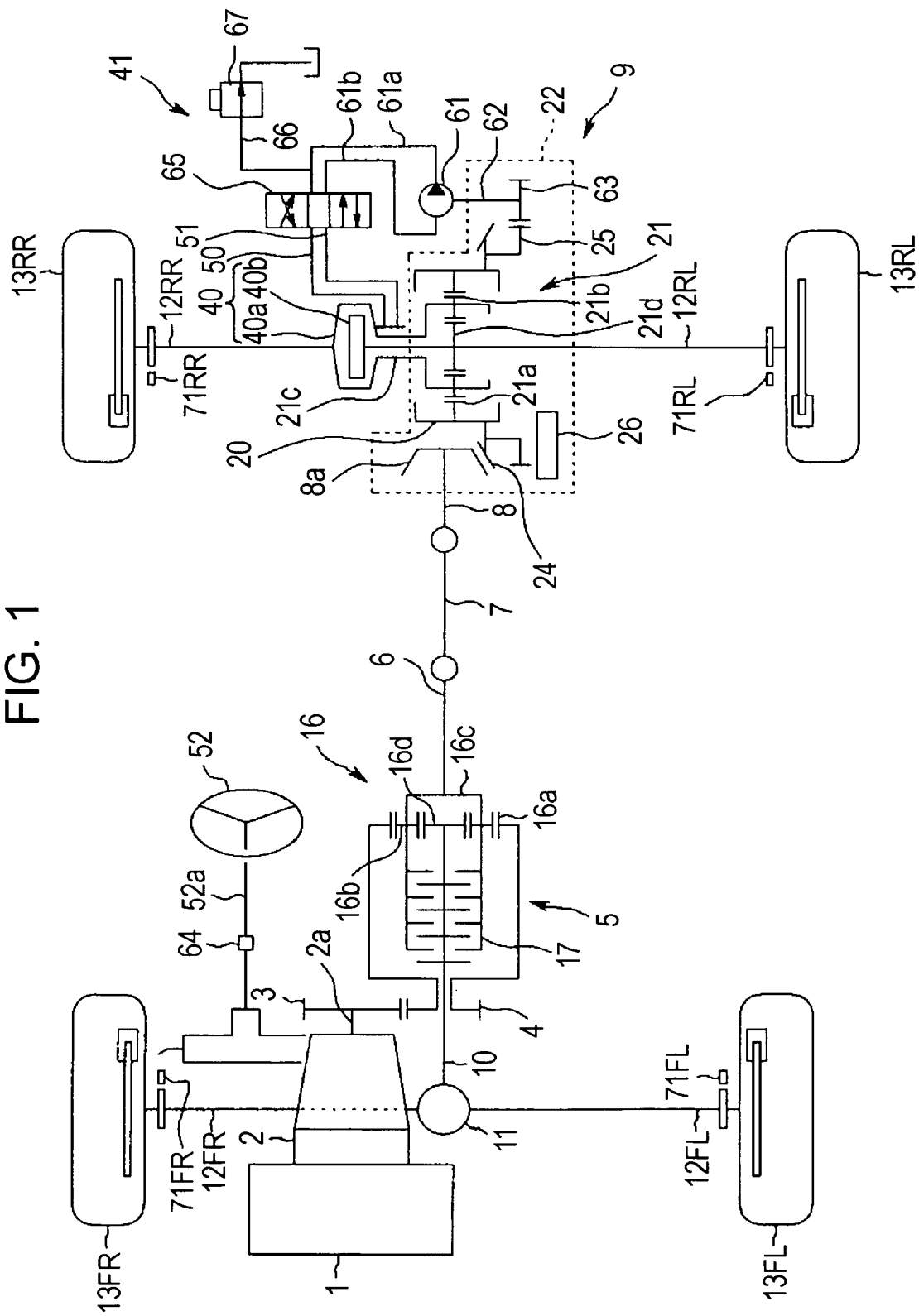
FIG. 1 is a schematic diagram of a vehicle behavior control device for a four-wheel-drive vehicle according to a first embodiment of the present invention.
Figure 2:
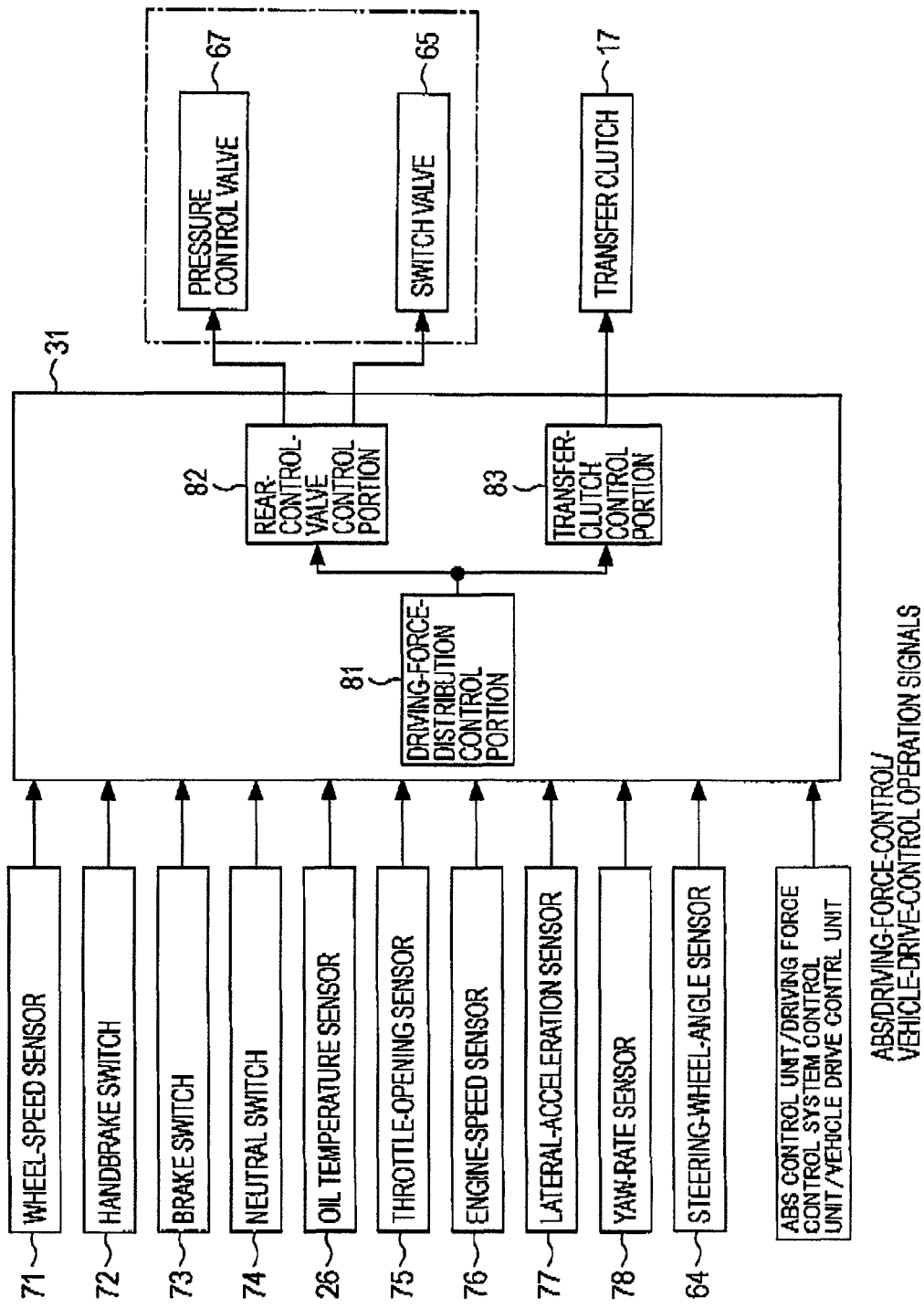
FIG. 2 is a functional block diagram of a control unit according to the first embodiment.
Figure 3:
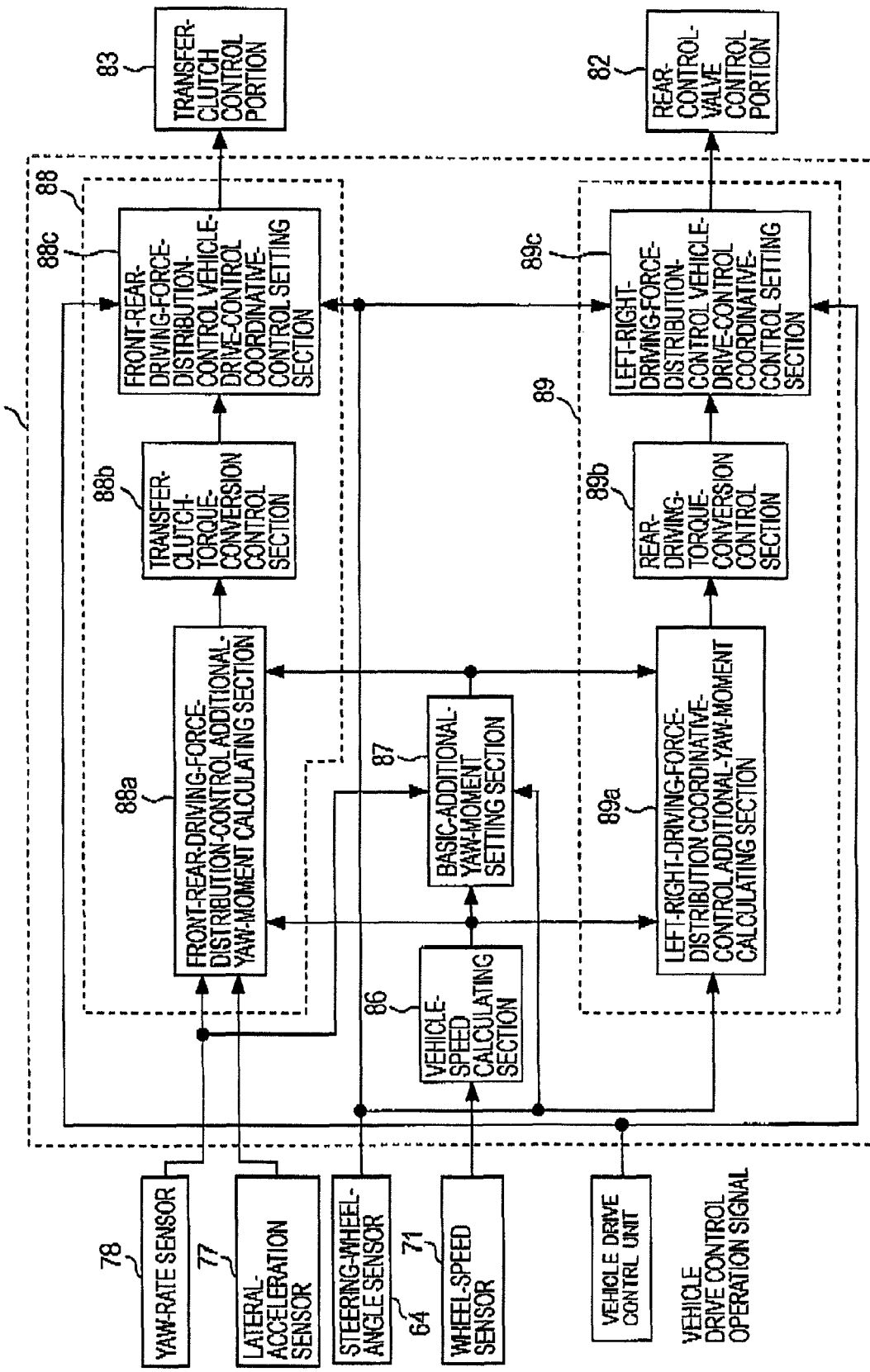
FIG. 3 is a functional block diagram of a driving-force distribution control portion according to the first embodiment.

FIGS. 1 to 16 illustrate a first embodiment of the present invention. FIG. 1 is a schematic diagram of a vehicle behavior control device for a four-wheel-drive vehicle. FIG. 2 is a functional block diagram of a control unit. FIG. 3 is a functional block diagram of a driving-force distribution control portion.

Reference numeral 1 in FIG. 1 denotes an engine. A transmission 2 (automatic transmission or manual transmission) is linked to this engine 1. The output from the engine 1 undergoes predetermined gear change and torque amplification at the transmission 2 and is subsequently output from an output shaft 2a. The output shaft 2a is provided with a drive gear 3 that constitutes a power transmission system. The drive gear 3 is meshed with a driven gear 4 provided in a center differential device 5.

The center differential device 5 receives a driving force from the transmission 2 and distributes the driving force to the front and rear wheels. The center differential device 5 is linked to a rear differential device 9 through a rear drive shaft 6, a propeller shaft 7, and a drive pinion shaft 8 that are located at the rear-wheel side of the center differential device 5. The center differential device 5 is also linked to a front differential device 11 through a front drive shaft 10 located at the front-wheel side of the center differential device 5.

The rear differential device 9 has rear axle shafts 12RL and 12RR extending leftward and rightward therefrom. The rear axle shafts 12RL and 12RR are respectively linked to left and right wheels 13RL and 13RR serving as rear left and right driving wheels. The front differential device 11 has front axle shafts 12FL and 12FR extending leftward and rightward therefrom. The front axle shafts 12FL and 12FR are respectively linked to left and right wheels 13FL and 13FR serving as front left and right driving wheels.

The center differential device 5 includes a known planetary-gear differential unit 16 having a ring gear 16a that is linked to the driven gear 4. The planetary-gear differential unit 16 also has a planetary carrier 16c that supports a plurality of planetary pinions 16b. The planetary carrier 16c is linked to the rear drive shaft 6. Moreover, the planetary-gear differential unit 16 has a sun gear 16d that is linked to the front drive shaft 10. Driven plates of a transfer clutch 17 serving as a limited slip differential are provided at an intermediate section of the front drive shaft 10. The driven plates have driving plates interposed therebetween, which are linked to the planetary carrier 16c.

A tightening force to be applied to the transfer clutch 17 is controlled or released by an electromagnetic or hydraulic actuator (not shown). When the transfer clutch 17 is tightened so as to become directly coupled to the differential unit 16, the transfer clutch 17 limits the differential so that torque is distributed in accordance with the ratio of the ground load between the front and rear wheels. For example, if the ratio of the ground load between the front and rear wheels is 50:50, an equal amount of torque (50:50) is distributed to the front and rear wheels. When the transfer clutch 17 is released, the differential limitation becomes cancelled, whereby the torque becomes distributed at a front-rear distribution ratio (e.g. biased toward the rear wheels at 35:65) set in the differential unit 16. The transfer clutch 17 operates continuously from the directly coupled state to the released state in accordance with a tightening-force indication output signal output from a transfer-clutch control portion 83 to be described later.

The rear differential device 9 includes a differential unit 21 that distributes a driving force transmitted from the drive pinion shaft 8 to the left and right rear axle shafts 12RL and 12RR, and a driving-force distribution unit 41 that adjusts the driving force distribution with respect to the rear axle shafts 12RL and 12RR. The differential unit 21 is housed within a differential housing 22. The differential housing 22 has an oil temperature sensor 26 that detects the oil temperature within the differential housing 22.

The differential unit 21 is of a planetary gear type. A differential casing 20 has a ring gear 21a of the differential unit 21 within the inner periphery thereof. The differential casing 20 also has a driven bevel gear 24 around the outer periphery thereof. The driven bevel gear 24 is meshed with a drive bevel pinion 8a formed on the drive pinion shaft 8. A planetary carrier 21c that supports a plurality of planetary pinions 21b is linked to the right rear axle shaft 12RR through a motor housing 40a for a hydraulic motor 40 included in the driving-force distribution unit 41. The left rear axle shaft 12RL axially supports a sun gear 21d. This sun gear 21d is linked to a cylinder block (inner rotary member) 40b of the hydraulic motor 40.

The differential casing 20 is provided with a pump drive gear 25. The pump drive gear 25 is meshed with a driven gear 63 provided on an input shaft 62 of a hydraulic pump 61. When the rotation of the drive pinion shaft 8 is transmitted to the differential casing 20 of the differential unit 21, the hydraulic pump 61 becomes rotationally driven. This rotation of the hydraulic pump 61 causes working oil to be discharged and also forces the ring gear 21a provided within the inner periphery of the differential casing 20 to rotate. The rotational force of the ring gear 21a is distributed to the right rear axle shaft 12RR and the left rear axle shaft 12RL through the planetary carrier 21c supporting the planetary pinions 21b and the sun gear 21d meshed with the planetary pinions 21b. At the same time, the planetary pinions 21b revolves so as to absorb the differential rotation of the two rear axle shafts 12RL and 12RR.

The hydraulic motor 40 is of a radial plunger type in which a plurality of plungers are held radially in a projectable and retractable manner on the outer periphery of the cylinder block 40b. The motor housing 40a that houses the cylinder block 40b also serves as a cam ring. Specifically, the motor housing 40a has a cam surface along the inner periphery thereof, which is engaged with the tip ends of the plungers held by the cylinder block 40b.

The hydraulic motor 40 communicates with oil supply/discharge channels 50 and 51 that are provided for supplying the plungers provided on the cylinder block 40b with the working oil supplied and discharged from the hydraulic pump 61. The plungers are divided into two groups: the plungers in one group are spatially connected to the oil supply/discharge channel 50 and the remaining plungers in the other group are spatially connected to the oil supply/discharge channel 51. On the other hand, the hydraulic pump 61 has an oil outlet channel 61a extending from an outlet port thereof and an oil inlet channel 61b extending from an inlet port thereof.

The oil supply/discharge channels 50 and 51, the oil outlet channel 61a, and the oil inlet channel 61b are connected to one another in a communicable and blockable manner by means of a switch valve 65. The switch valve 65 is an electromagnetic directional switch valve of a 2-port 4-position type and is switchable bidirectionally from a neutral state shown in FIG. 1 on the basis of a left-right torque switch indication output signal output from a rear-control-valve control portion 82 to be described later. When the switch valve 65 is in its neutral state, the oil supply/discharge channels 50 and 51 are directly connected to each other, such that the cylinder block 40b and the motor housing 40a are in a freely rotatable state.

When the switch valve 65 is switched to one side, the oil outlet channel 61a and the oil supply/discharge channel 50 become spatially connected to each other, and the oil inlet channel 61b and the oil supply/discharge channel 51 also become spatially connected to each other. On the other hand, when the switch valve 65 is switched to the other side, the oil outlet channel 61a and the oil supply/discharge channel 51 become spatially connected to each other, and the oil inlet channel 61b and the oil supply/discharge channel 50 also become spatially connected to each other. Consequently, with the switching operation of the switch valve 65, the connections among the oil channels 61a and 61b at the hydraulic pump 61 side and the oil channels 50 and 51 at the hydraulic motor 40 side can be appropriately switched. This allows for shifting of a required torque from the right rear axle shaft 12RR to the left rear axle shaft 12RL or from the left rear axle shaft 12RL to the right rear axle shaft 12RR.

An oil relief channel 66 branches off from the oil outlet channel 61a. The oil relief channel 66 has a pressure control valve 67 that controls the oil pressure to be supplied to the hydraulic motor 40.

The switching operation of the switch valve 65 and the control operation of the pressure control valve 67 are performed on the basis of a left-right torque switch indication output signal output from the rear-control-valve control portion 82 to be described later and a hydraulic-motor pressure indication output signal.

The axle shafts 12FL, 12FR, 12RL, and 12RR are respectively provided with wheel-speed sensors 71FL, 71FR, 71RL, and 71RR that detect rotational speeds $\omega FL$, $\omega FR$, $\omega RL$, and $\omega RR$ of the wheels 13FL, 13FR, 13RL, and 13RR. A steering shaft 52a that rotates together with a steering wheel 52 is provided with a steering-wheel-angle sensor 64 serving as steering-wheel-angle detecting means. Specifically, the steering-wheel-angle sensor 64 detects a steering-wheel angle $\theta_H$ of the steering wheel 52 (the polarity of the steering-wheel angle $\theta_H$ in this embodiment is expressed such that the steering-wheel angle $\theta_H$ is positive (+) when the vehicle makes a right turn, whereas the steering-wheel angle $\theta_H$ is negative (−) when the vehicle makes a left turn).

The driving-force distribution with respect to the center differential device 5 and the rear differential device 9 is controlled by a driving-force-distribution control unit 31 shown in FIG. 2. The driving-force-distribution control unit 31 mainly includes a microcomputer and has, for example, a central processing unit (CPU), a read-only memory (ROM), a random-access memory (RAM), and a known non-volatile memory such as an electrically erasable programmable read-only memory (EEPROM). The input side of the drivingforce-distribution control unit 31 is connected to the wheel-speed sensors 71FL, 71FR, 71RL, and 71RR (expressed collectively as a "wheel-speed sensor 71" in the drawings), a parking brake switch 72 that is turned on when the parking brake lever is manipulated, a brake switch 73 that is turned on when it detects that the brake pedal is pressed, a neutral switch 74 that is turned on when a select lever of the transmission 2 is set to a neutral position, the oil temperature sensor 26, a throttle-opening sensor 75 serving as throttle-opening detecting means that detects the opening (throttle opening) of a throttle valve (an electronically controlled throttle valve in this embodiment), an engine-speed sensor 76 that detects an output-shaft speed of the engine 1, a lateral-acceleration sensor 77 serving as lateral-acceleration detecting means that detects a lateral acceleration acting on the vehicle, a yaw-rate sensor 78 serving as yaw-rate detecting means that detects a yaw rate acting on the vehicle, and the steering-wheel-angle sensor 64. The driving-force-distribution control unit 31 receives an ABS operation signal from an ABS (antilock brake system) control unit, a driving-force-control-system operation signal from a driving-force-control-system control unit, and a vehicle drive control operation signal from a vehicle drive control unit. The vehicle drive control operation signal contains operation information for sideslip prevention. The ABS control unit, the driving-force-control-system control unit, and the vehicle drive control unit are shown in, for example, FIG. 2. These operation signals are output at the time of a braking operation.

The ABS control unit can detect a locked state of the wheels on the basis of signals from the wheel-speed sensors 71FL, 71FR, 71RL, and 71RR. For a wheel that has been detected as being in a locked state, the ABS control unit performs control to reduce the oil pressure of a brake system (not shown) so as to avoid locking of the wheel during a braking operation. When the driving-force-control-system control unit detects that the driving wheels are slipping, the driving-force-control-system control unit performs control to prevent the slipping of the driving wheels by reducing the opening of the throttle valve to limit the engine output. The vehicle drive control unit, which is typical sideslip prevention controlling means, performs control to stabilize the vehicle behavior. Specifically, the vehicle drive control unit performs control to apply a braking force to the outer front wheel during cornering if the vehicle is in an oversteer condition. If the vehicle is in an understeer condition, the vehicle drive control unit performs control to apply a braking force to the inner rear wheel during cornering and to limit the engine output by reducing the opening of the throttle valve.

The output side of the driving-force-distribution control unit 31 is connected to actuators for the pressure control valve 67 and the switch valve 65 of the rear differential device 9, and to the actuator for the transfer clutch 17.

As functions for executing driving-force distribution with respect to the front and rear wheels and driving-force distribution with respect to the rear left and right wheels, the driving-force-distribution control unit 31 is equipped with a driving-force-distribution control portion 81 serving as driving-force-distribution controlling means, the aforementioned rear-control-valve control portion 82, and the aforementioned transfer-clutch control portion 83.

Referring to FIG. 3, the driving-force-distribution control portion 81 includes a vehicle-speed calculating section 86, a basic-additional-yaw-moment setting section 87, a front-rear driving-force distribution controller 88 serving as front-rear driving-force distribution controlling means, and a left-right driving-force distribution controller 89 serving as left-right driving-force distribution controlling means. The front-rear driving-force distribution controller 88 includes a front-rear-driving-force-distribution-control additional-yaw-moment calculating section 88a, a transfer-clutch-torque conversion control section 88b, and a front-rear-driving-force-distribution-control vehicle-drive-control coordinative-control setting section 88c. The left-right driving-force distribution controller 89 includes a left-right-driving-force-distribution coordinative-control additional-yaw-moment calculating section 89a, a rear-driving-torque conversion control section 89b, and a left-right-driving-force-distribution-control vehicle-drive-control coordinative-control setting section 89c.

The driving-force-distribution control portion 81 calculates an appropriate vehicle behavior based on driving conditions of the vehicle detected by the various sensors. Moreover, in order to realize this vehicle behavior, the driving-force-distribution control portion 81 performs vehicle control by outputting appropriate control indication values to the transfer clutch 17 of the center differential device 5 and to the pressure control valve 67 and the switch valve 65 of the rear differential device 9. When the vehicle drive control unit is in operation, the driving-force-distribution control portion 81 performs control in coordination with this vehicle drive control unit and outputs appropriate control indication signals to the transfer clutch 17 of the center differential device 5 and to the pressure control valve 67 and the switch valve 65 of the rear differential device 9, thereby controlling the behavior of the vehicle.

More specifically, the vehicle-speed calculating section 86 provided as vehicle-speed calculating means in the driving-force-distribution control portion 81 determines a vehicle speed V (m/s) from an average value of the rotational speeds ωFL, ωFR, ωRL, and ωRR detected by the wheel-speed sensors 71FL, 71FR, 71RL, and 71RR.

Figure 4:
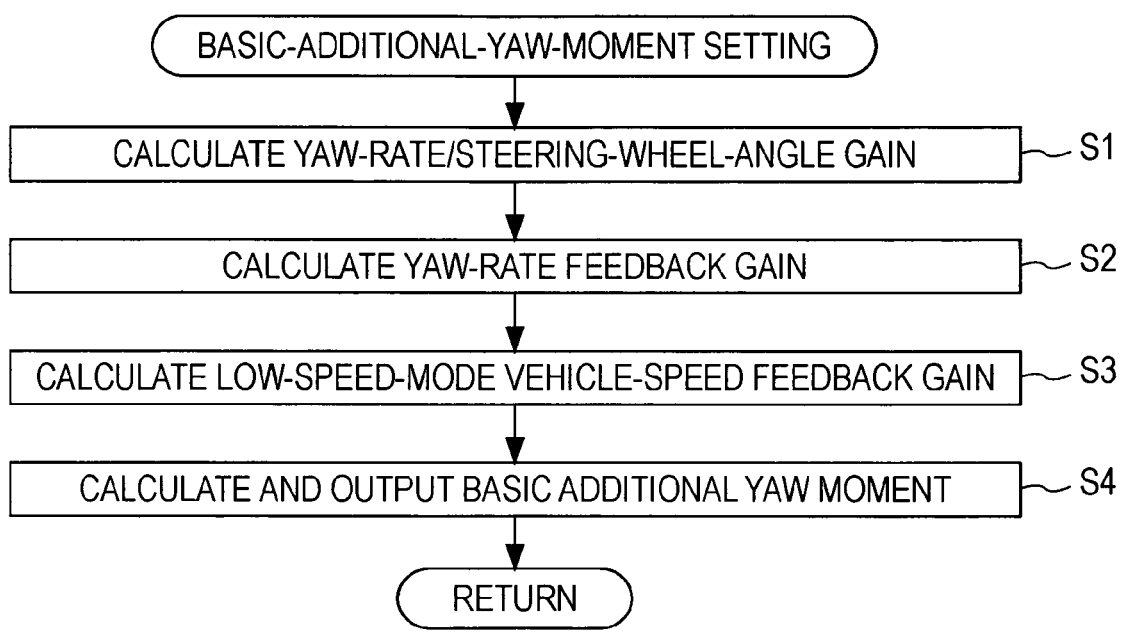
FIG. 4 is a flow chart showing a basic-additional-yaw-moment setting routine according to the first embodiment.

The basic-additional-yaw-moment setting section 87 serving as additional-yaw-moment setting means sets a basic additional yaw moment $YM_{all}$, which is a basic yaw moment to be added to the vehicle, in accordance with a basic-additional-yaw-moment setting routine shown in FIG. 4. Specifically, in this routine, a yaw-rate/steering-wheel-angle gain $G_\gamma$ is calculated in step S1 from the following equation.

$$G_\gamma = (1/(1+A \cdot V^2)) \cdot (V/L) \cdot (1/n) \tag{1}$$

In this case, "A" denotes a stability factor ($s^2/m^2$) that indicates ideal steering characteristics and is tunable to a desired value. Moreover, L denotes a wheel base (m), and n denotes a steering-gear ratio. The wheel base L and the steering-gear ratio n are fixed values that are determined for each vehicle type.

In step S2, a yaw-rate feedback gain $K_\gamma$ is determined. To determine this yaw-rate feedback gain $K_\gamma$, a steering-wheel-angle feedback gain $K_\theta$ is first determined from the following equation.

$$K_\theta = L_f \cdot 2 \cdot K_f \tag{2}$$

In this case, $L_f$ denotes a distance (m) between the front axle and the center of gravity, and $K_f$ denotes a cornering power (N/rad) of one wheel on the front axle. The distance $L_f$ between the front axle and the center of gravity and the cornering power $K_f$ of one wheel on the front axle are fixed values. Subsequently, a yaw-rate feedback gain $K_\gamma$ is determined based on this steering-wheel-angle feedback gain $K_\theta$ from the following equation.

$$K_\gamma = K_\theta / G_\gamma \tag{3}$$

Figure 9:
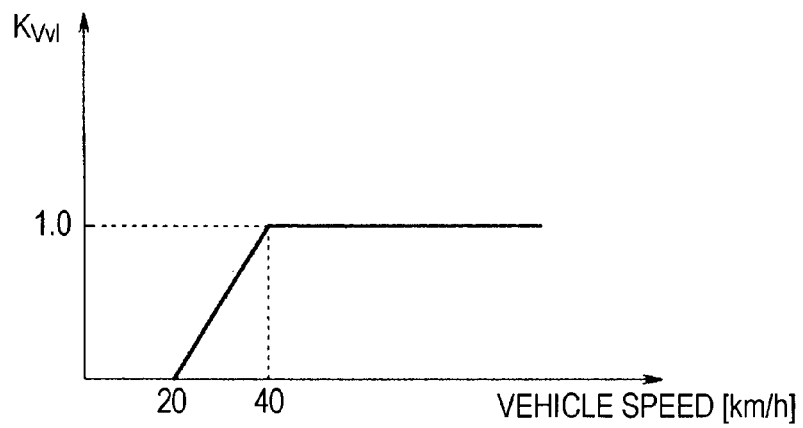
FIG. 9 is a conceptual diagram showing a low-speed-mode vehicle-speed feedback gain table according to the first embodiment.

In step S3, a low-speed-mode vehicle-speed feedback gain $K_{Vvl}$ is set on the basis of the vehicle speed V by referring to a low-speed-mode vehicle-speed feedback gain table shown in FIG. 9. This low-speed-mode vehicle-speed feedback gain $K_{Vvl}$ is set for avoiding an unnecessary additional yaw moment when the vehicle is running under an extremely low speed mode (about 0 to 20 (km/h)).

In step S4, a basic additional yaw moment $YM_{all}$ (Nm) is determined from the following equation, and the determined value is subsequently output. Finally, the process exits the routine. In this embodiment, the polarity of the basic additional yaw moment $YM_{all}$ is expressed such that the basic additional yaw moment $YM_{all}$ is positive (+) when the vehicle yaws toward the right, whereas the basic additional yaw moment $YM_{all}$ is negative (−) when the vehicle yaws toward the left.

$$YM_{all}=(-K_\gamma \cdot \gamma + K_\theta \cdot \theta_H) \cdot K_{Vvl} \quad (4)$$

In this case, γ denotes a yaw rate (rad/s) detected by the yaw-rate sensor 78, and $\theta_H$ denotes a steering-wheel angle (rad) detected by the steering-wheel-angle sensor 64. In other words, the basic additional yaw moment $YM_{all}$ is a basic additional yaw moment $YM_{all}$ (Nm) determined from a difference between a yaw moment ($-K_\gamma \cdot \gamma$) acting on the vehicle and having the yaw rate γ as a parameter and a yaw moment ($K_\theta \cdot \theta_H$) to be generated in accordance with the steering-wheel angle and having the steering-wheel angle $\theta_H$ as a parameter.

The basic additional yaw moment $YM_{all}$ set in the basic-additional-yaw-moment setting section 87 is read by the front-rear-driving-force-distribution-control additional-yaw-moment calculating section 88$a$ of the front-rear driving-force distribution controller 88 and also by the left-right-driving-force-distribution coordinative-control additional-yaw-moment calculating section 89$a$ of the left-right driving-force distribution controller 89.

Figure 5:
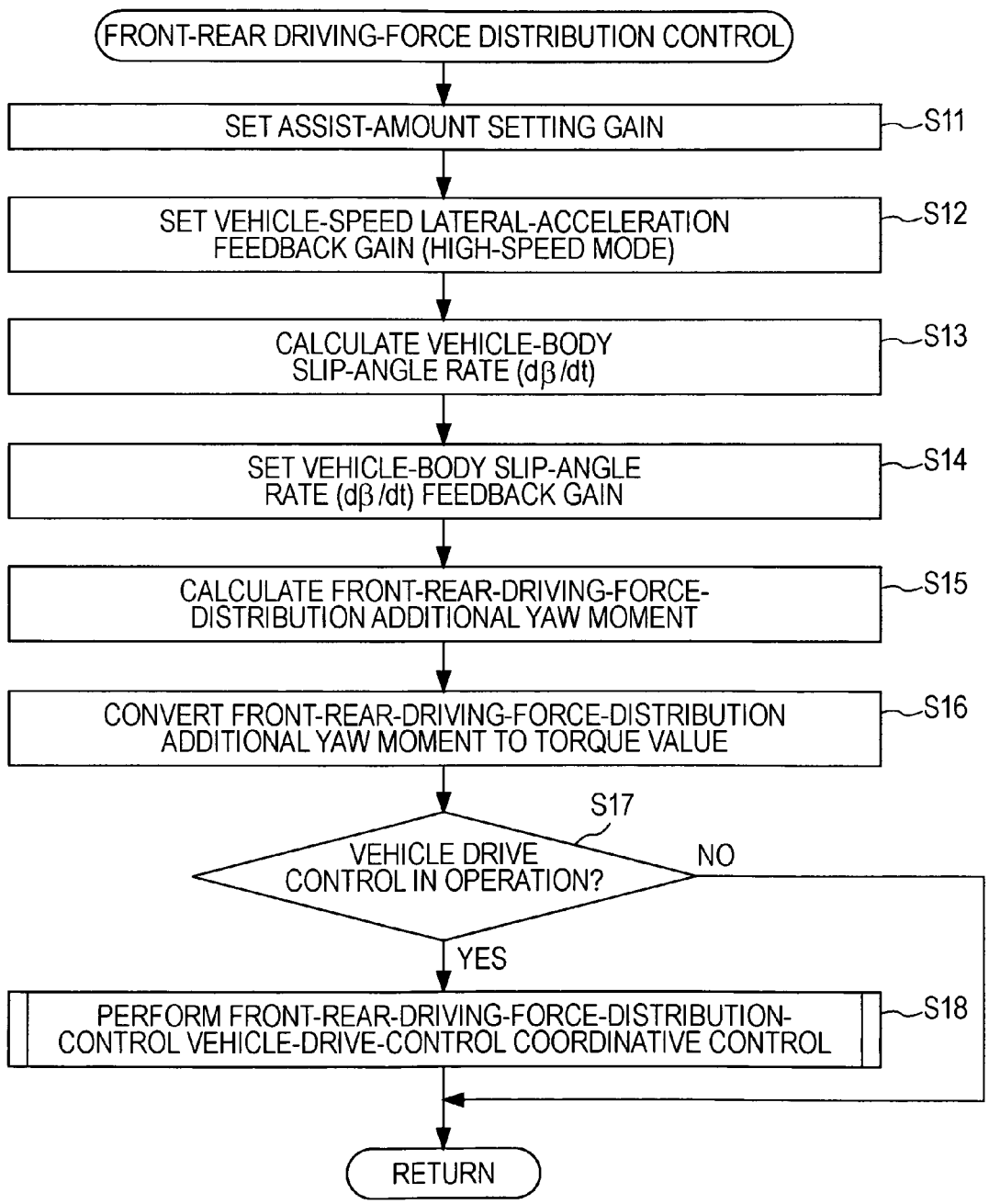
FIG. 5 is a flow chart showing a front-rear driving-force distribution control routine according to the first embodiment.

The front-rear driving-force distribution controller 88 performs a process specifically in accordance with a front-rear driving-force distribution control routine shown in FIG. 5. Steps S11 to S15 in this routine are performed in the front-rear-driving-force-distribution-control additional-yaw-moment calculating section 88$a$, step S16 is performed in the transfer-clutch-torque-conversion control section 88$b$, and steps S17 and S18 are performed in the front-rear-driving-force-distribution-control vehicle-drive-control coordinative-control setting section 88$c$.

In this routine, a gain $K_{AVTD}$ for setting an assist amount (assist-amount setting gain) is set in step S11. This assist-amount setting gain $K_{AVTD}$ is a fixed value.

Figure 10:
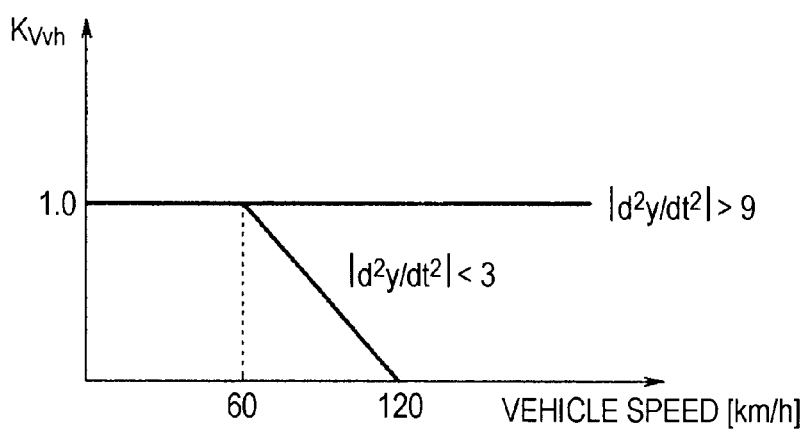
FIG. 10 is a conceptual diagram showing a vehicle-speed lateral-acceleration feedback gain table according to the first embodiment.

In step S12, a vehicle-speed lateral-acceleration feedback gain (high-speed mode) $K_{Vvh}$ is set on the basis of the vehicle speed V by referring to a vehicle-speed lateral-acceleration feedback gain table shown in FIG. 10. This vehicle-speed lateral-acceleration feedback gain (high-speed mode) $K_{Vvh}$ is set for suppressing excessive yawing when the vehicle is on a low μ road in a high-speed range. As shown in FIG. 10, the vehicle-speed lateral-acceleration feedback gain (high-speed mode) $K_{Vvh}$ table is switchable in accordance with an absolute value of a lateral acceleration ($d^2y/dt^2$) (m/s$^2$) detected by the lateral-acceleration sensor 77.

In step S13, a vehicle-body slip-angle rate (dβ/dt) is determined from the following equation.

$$(d\beta/dt)=|((d^2y/dt^2)/V)-\gamma| \quad (5)$$

Figure 11:
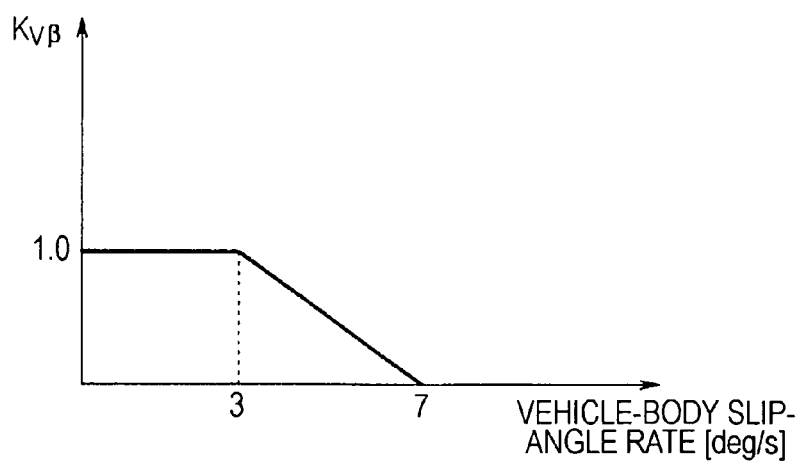
FIG. 11 is a conceptual diagram showing a vehicle-body slip-angle rate feedback gain table according to the first embodiment.

In step S14, a vehicle-body slip-angle rate feedback gain $K_{Vβ}$ is set on the basis of the vehicle-body slip-angle rate (dβ/dt) by referring to a vehicle-body slip-angle rate feedback gain table shown in FIG. 11. This vehicle-body slip-angle rate feedback gain $K_{Vβ}$ is set for suppressing excessive yawing when the vehicle is in a critical range. However, there are moments when the vehicle-body slip-angle rate (dβ/dt) transiently becomes a small value even when the vehicle is in a critical range. For this reason, the recovery gradient of the vehicle-body slip-angle rate feedback gain $K_{Vβ}$ is limited to the following relationship.

$$K_{Vβ}(K) \leq K_{Vβ}(K-1) + \Delta K_{Vβ}(K) \cdot \Delta t$$

In this case, (K) denotes a current value, (K−1) denotes a previous value, $\Delta K_{Vβ}$ denotes a recovery gradient (fixed value) of the vehicle-body slip-angle rate feedback gain, and Δt denotes a calculation cycle (s).

In step S15, a front-rear-driving-force-distribution additional yaw moment $YM_{VTD}$ is determined from the following equation.

$$YM_{VTD}=K_{AVTD} \cdot K_{Vvh} \cdot K_{Vβ} \cdot YM_{all} \quad (6)$$

In step S16, this front-rear-driving-force-distribution additional yaw moment $YM_{VTD}$ is converted to a steering-wheel-angle/yaw-rate feedback control LSD (limited slip differential) torque $T_{LSD\_P}$ (Nm) depending on the polarity of the steering-wheel angle $\theta_H$ on the basis of the following equations.

When $\theta_H \geq 0$ (right steering), $$T_{LSD\_P}=-K_{LSD\_V} \cdot YM_{VTD} \quad (7a)$$

When $\theta_H < 0$ (left steering), $$T_{LSD\_P}=K_{LSD\_V} \cdot YM_{VTD} \quad (7b)$$

In this case, $K_{LSD\_V}$ denotes a conversion coefficient that is determined for each vehicle by tuning.

In step S17, the front-rear-driving-force-distribution-control vehicle-drive-control coordinative-control setting section 88$c$ reads a vehicle drive control operation signal output from the vehicle drive control unit and checks whether or not vehicle drive control is in operation. If the vehicle drive control for sideslip prevention is in operation, the process proceeds to step S18. In contrast, if the vehicle drive control is not in operation, the process exits the routine and the steering-wheel-angle/yaw-rate feedback control LSD (limited slip differential) torque $T_{LSD\_P}$ is output to the front-rear-driving-force-distribution-control vehicle-drive-control coordinative-control setting section 88$c$.

Specifically, when the vehicle drive control is not in operation, vehicle-drive-control coordinative control is not performed in the front-rear-driving-force-distribution-control vehicle-drive-control coordinative-control setting section 88$c$. Therefore, the steering-wheel-angle/yaw-rate feedback control LSD (limited slip differential) torque $T_{LSD\_P}$ (Nm) is directly output to the transfer-clutch control portion 83. Then, a transfer-clutch tightening-force indication output signal corresponding to the steering-wheel-angle/yaw-rate feedback control LSD (limited slip differential) torque $T_{LSD\_P}$ is output from the transfer-clutch control portion 83 to the actuator for the transfer clutch 17, whereby a clutch tightening force for the transfer clutch 17 is controlled.

On the other hand, if it is determined that the vehicle drive control is in operation in step S17, the process proceeds to step S18 where coordinative control between front-rear driving-force distribution control and vehicle drive control (i.e. front-rear-driving-force-distribution-control vehicle-drive-control coordinative control) is performed. The process then exits the routine. Specifically, this coordinative control is performed in accordance with a front-rear-driving-force-distribution-control vehicle-drive-control coordinative control routine shown in FIG. 7. Details of the front-rear-drivingforce-distribution-control vehicle-drive-control coordinative control will be described later.

A process performed in the left-right driving-force distribution controller 89 will now be described. Specifically, the left-right driving-force distribution controller 89 performs this process in accordance with a left-right driving-force distribution control routine shown in FIG. 6. In detail, steps S21 to S24 in this routine are performed in the left-right-driving-force-distribution coordinative-control additional-yaw-moment calculating section 89a, step S25 is performed in the rear-driving-torque conversion control section 89b, and steps S26 and S27 are performed in the left-right-driving-force-distribution-control vehicle-drive-control coordinative-control setting section 89c.

In this routine, a gain $K_{ADYC}$ for setting an assist amount (assist-amount setting gain) is set in step S21. This assist-amount setting gain $K_{ADYC}$ is a value that determines an assist amount for avoiding a sense of discomfort felt by the driver caused by a steering-wheel-angle/yaw-rate feedback control DYC (direct yaw-moment control) torque $T_{DYC\_P}$ being stuck at the upper limit when the vehicle is in a critical range. Moreover, this value is a fixed value.

In step S22, a vehicle-speed feedback gain $K_{YZ\theta}$ is set on the basis of the vehicle speed V. This vehicle-speed feedback gain $K_{YZ\theta}$ is set for avoiding an excessive additional yaw moment when the vehicle is running in a high-speed range. Accordingly, this vehicle-speed feedback gain $K_{YZ\theta}$ can be effective for when yawing is excessive and for when a higher damping effect is desired.

When setting a vehicle-speed feedback gain $K_{YZ\theta}$, the polarities of the steering-wheel angle $\theta_H$ (being positive (+) for right steering and negative (−) for left steering) and the basic additional yaw moment $YM_{all}$ (being positive (+) for right yawing and negative (−) for left yawing) are first compared. If the steering-wheel angle $\theta_H$ and the basic additional yaw moment $YM_{all}$ have the same polarity (yawing direction), it is determined that the current running condition is an understeer condition. In contrast, if the polarities are different from each other (damping direction), it is determined that the current running condition is an oversteer condition. For example, a damping effect tends to occur easily when the vehicle is running along a continuous curve while the steering wheel is turned back or when the vehicle changes lanes on a low μ road.

Figure 12A:
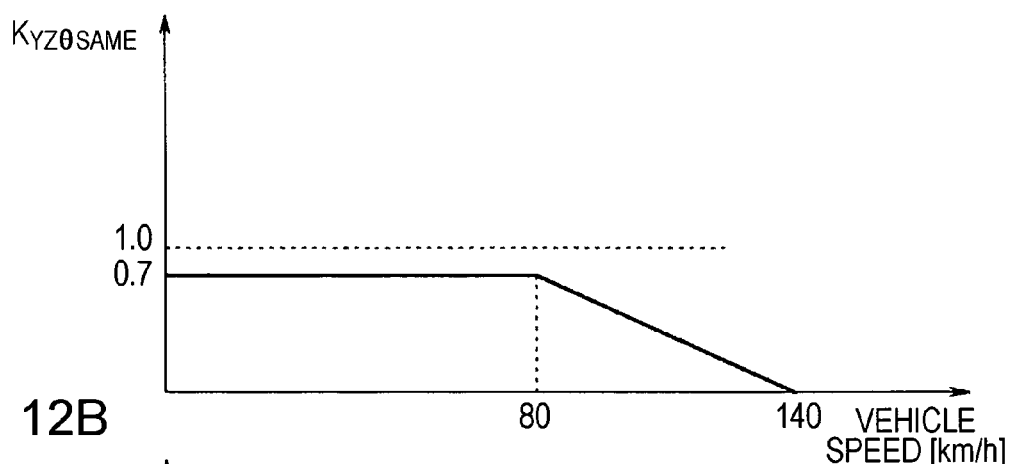
FIG. 12A is a conceptual diagram showing an understeer vehicle-speed feedback gain table according to the first embodiment.
Figure 12B:
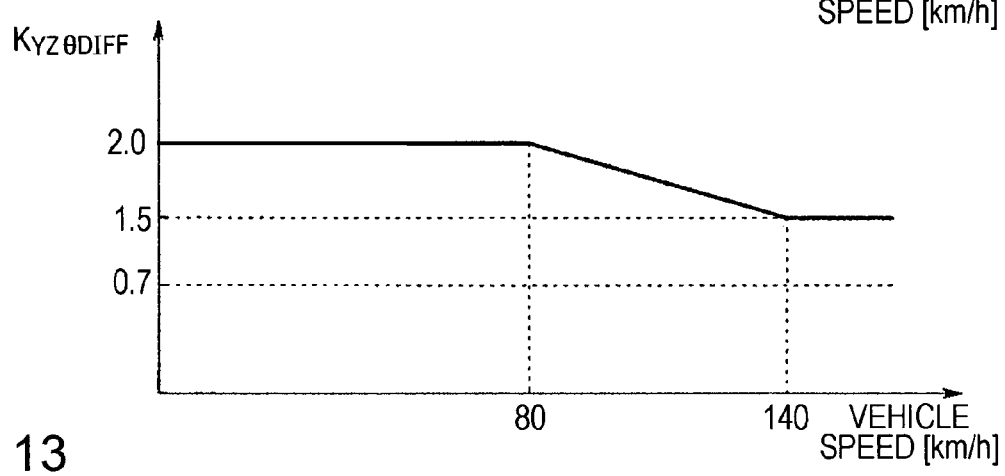
FIG. 12B is a conceptual diagram showing an oversteer vehicle-speed feedback gain table according to the first embodiment.
Figure 13:
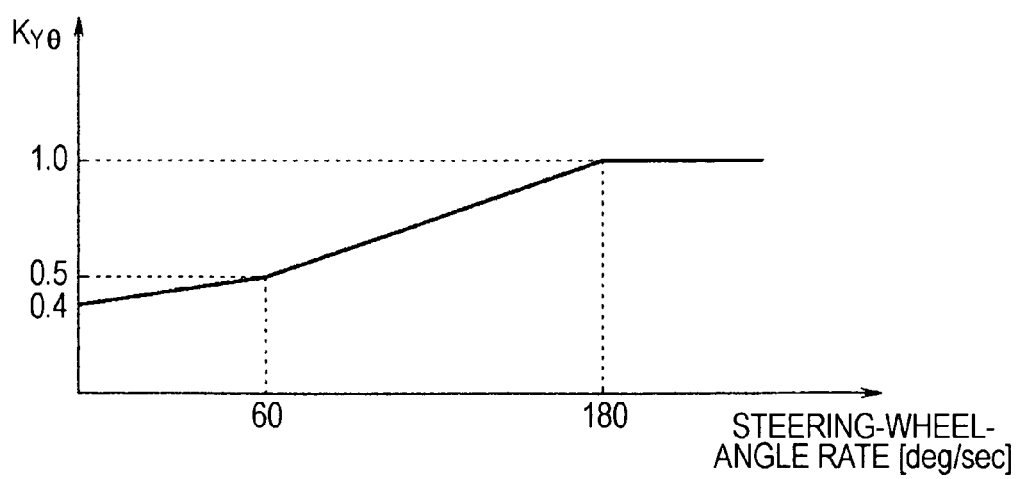
FIG. 13 schematically illustrates a steering-wheel-angle rate feedback gain table according to the first embodiment.

If an understeer condition is determined, an understeer vehicle-speed feedback gain $K_{YZ\theta SAME}$ is set on the basis of the vehicle speed V by referring to an understeer vehicle-speed feedback gain table shown in FIG. 12A. If an oversteer condition is determined, an oversteer vehicle-speed feedback gain $K_{YZ\theta DIFF}$ is set on the basis of the vehicle speed V by referring to an oversteer vehicle-speed feedback gain table shown in FIG. 12B. The understeer vehicle-speed feedback gain $K_{YZ\theta SAME}$ and the oversteer vehicle-speed feedback gain $K_{YZ\theta DIFF}$ are each set with respect to steering characteristics during turning of the vehicle. Consequently, the understeer vehicle-speed feedback gain $K_{YZ\theta SAME}$ shown in FIG. 12A is set such that the driving force to be distributed to the outer rear wheel (rear right wheel 13RR during left turn) is small when the vehicle is running in a low to medium speed mode. On the other hand, the oversteer vehicle-speed feedback gain $K_{YZ\theta DIFF}$ shown in FIG. 12B is set such that the driving force to be distributed to the inner rear wheel (rear left wheel 13RL during left turn) is large when the vehicle is running in a low to medium speed mode. Accordingly, in order to add a yaw moment towards the yawing side where the steering-wheel angle $\theta_H$ and the basic additional yaw moment $YM_{all}$ have the same polarity, the driving force distribution with respect to the outer rear wheel is set to a small value. On the other hand, in order to add a yaw moment towards the damping side where the steering-wheel angle $\theta_H$ and the basic additional yaw moment $YM_{all}$ have different polarities, the driving force distribution with respect to the outer rear wheel is set to a large value.

Figure 14:
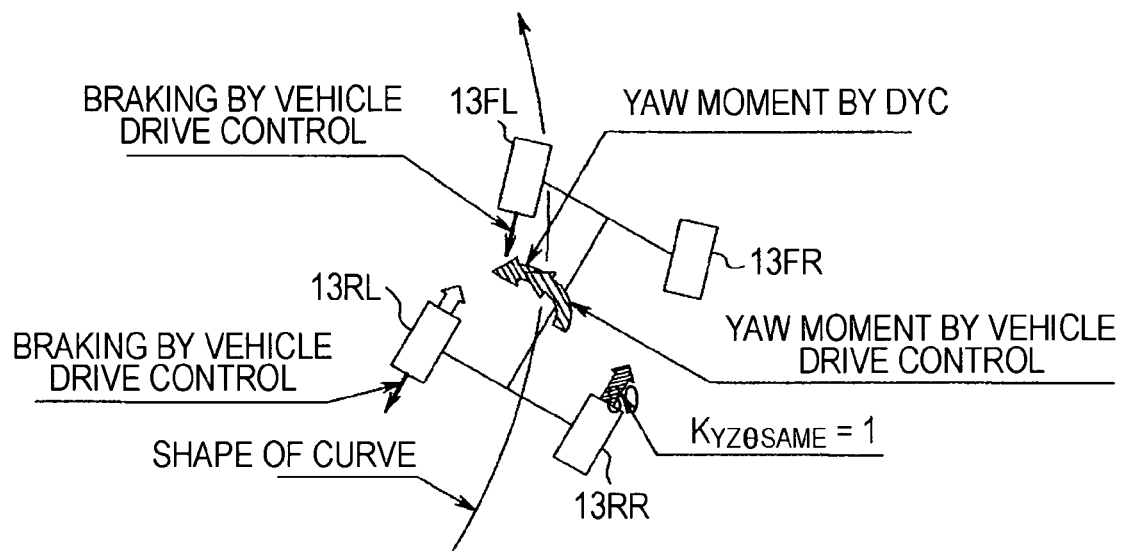
FIG. 14 illustrates coordinative control between vehicle drive control and left-right driving-force distribution control performed when a vehicle is in an understeer condition, according to the first embodiment.

The determination of inner and outer wheels during turning of the vehicle is implemented on the basis of the polarity of the lateral acceleration. In detail, a turn trajectory in FIG. 14 shows that the vehicle is making a right turn. Therefore, when the lateral acceleration is a negative value, the rear left wheel 13RL is the inner rear wheel and the rear right wheel 13RR is the outer rear wheel. This determination similarly applies to FIG. 15 where the rear left wheel 13RL is the inner rear wheel and the rear right wheel 13RR is the outer rear wheel.

The understeer vehicle-speed feedback gain $K_{YZ\theta SAME}$ or the oversteer vehicle-speed feedback gain $K_{YZ\theta DIFF}$ is set as a vehicle-speed feedback gain $K_{YZ\theta}$.

Subsequently, in step S23, a steering-wheel-angle rate feedback gain $K_{Y\theta}$ is set. This steering-wheel-angle rate feedback gain $K_{Y\theta}$ is for suppressing intervention of excessive control at the time of a normal running condition and is set on the basis of a steering-wheel-angle rate $\theta_H$ (deg/sec) by referring to a steering-wheel-angle rate feedback gain table shown in FIG. 13.

In step S24, a left-right-driving-force-distribution additional yaw moment $YM_Z$ is determined from the following equation.

$$YM_Z = K_{ADYC} \cdot K_{YZ\theta} \cdot K_{Y\theta} \cdot YM_{all} \qquad (8)$$

In step S25, the left-right-driving-force-distribution additional yaw moment $YM_Z$ is converted to a steering-wheel-angle/yaw-rate feedback control DYC torque $T_{DYC\_P}$ on the basis of the following equations. A turn flag VDC_H (0: neutral; 1: right turn; −1: left turn) set on the basis of the steering-wheel-angle/yaw-rate feedback control DYC (direct yaw-moment control) torque $T_{DYC\_P}$ and the steering-wheel angle $\theta_H$ (0: neutral; +: right steering; −: left steering) is then output to the left-right-driving-force-distribution-control vehicle-drive-control coordinative-control setting section 89c.

When $\theta_H > 0$ (right turn), $$T_{DYC\_P} = -K_R \cdot YM_Z \qquad (9a)$$

When $\theta_H < 0$ (left turn), $$T_{DYC\_P} = K_R \cdot YM_Z \qquad (9b)$$

In this case, $K_R$ is a fixed value preliminarily determined from, for example, testing.

In step S26, the left-right-driving-force-distribution-control vehicle-drive-control coordinative-control setting section 89c reads the vehicle drive control operation signal output from the vehicle drive control unit and checks whether or not the vehicle drive control is in operation. If the vehicle drive control is in operation, the process proceeds to step S27, whereas if the vehicle drive control is not in operation, the process exits the routine.

Consequently, when the vehicle drive control is not in operation, the driving-force-distribution control portion 81 outputs the steering-wheel-angle/yaw-rate feedback control DYC (direct yaw-moment control) torque $T_{DYC\_P}$ to the rear-control-valve control portion 82. On the other hand, when it is determined in step S26 that the vehicle drive control is in operation and the process thus proceeds to step S27, coordinative control between left-right driving-force distribution control and vehicle drive control (i.e. left-right-driving-force-distribution-control vehicle-drive-control coordinative control) is performed. The process then exits the routine. This left-right-driving-force-distribution-control vehicle-drive-control coordinative control is performed in accordance with a left-right-driving-force-distribution-control vehicle-drive-control coordinative control routine shown in FIG. 8.

Figure 7:
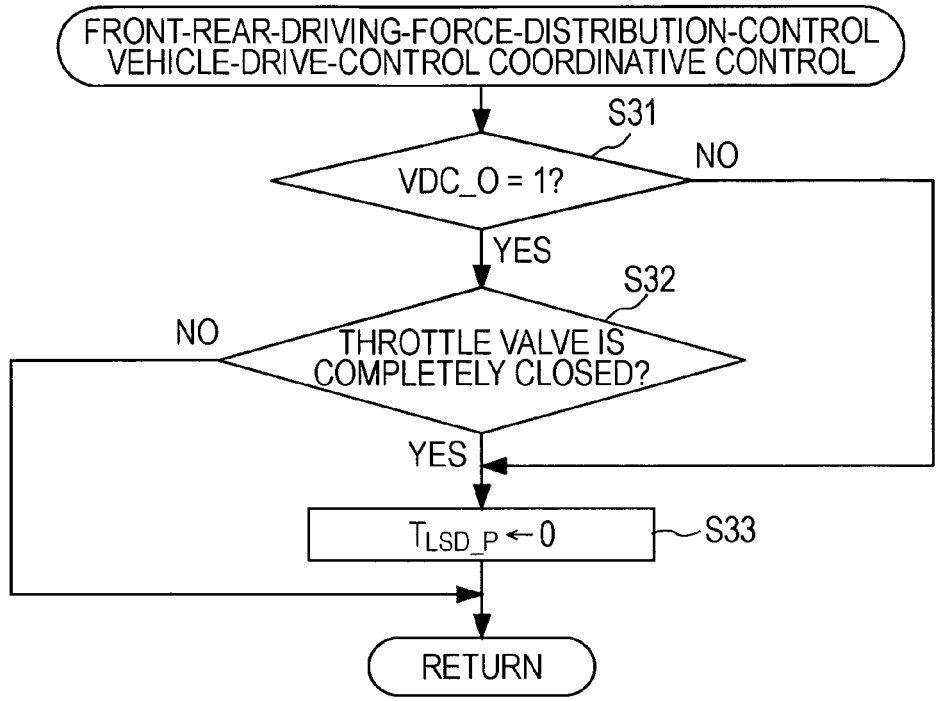
FIG. 7 is a flow chart showing a front-rear-driving-force-distribution-control vehicle-drive-control coordinative control routine according to the first embodiment.

The front-rear-driving-force-distribution-control vehicle-drive-control coordinative control routine shown in FIG. 7 will now be described. This routine starts with step S31 which is a step for reading an oversteer determination flag VDC_O (or an understeer determination flag VDC_U) included in the vehicle drive control operation signal input to the front-rear-driving-force-distribution-control vehicle-drive-control coordinative-control setting section 88c of the front-rear driving-force distribution controller 88 from the vehicle drive control unit. When the vehicle is running in an oversteer condition, the vehicle drive control unit outputs a signal indicating VDC_O=1 and/or VDC_U=0, whereas when the vehicle is running in an understeer condition, the vehicle drive control unit outputs a signal indicating VDC_O=0 and/or VDC_U=1. In this embodiment, an oversteer condition or an understeer condition of the vehicle is determined based only on the value of the oversteer determination flag VDC_O.

When an oversteer condition is determined from VDC_O=1, the process proceeds to step S32. On the other hand, when an understeer condition is determined from VDC_O=0, the process skips to step S33. Step S32 is a step for checking whether or not the throttle valve is completely closed on the basis of the throttle opening detected by the throttle-opening sensor 75. If the throttle valve is completely closed, the process proceeds to step S33. If the throttle valve is open, the process directly exits the routine.

When the process proceeds to step S33 from step S31 or S32, the steering-wheel-angle/yaw-rate feedback control LSD torque $T_{LSD\_P}$ is set to $T_{LSD\_P}=0$. Subsequently, the process exits the routine.

As a result, when the following conditions are satisfied: the vehicle drive control is in operation, the vehicle is in an oversteer condition (VDC_O=1), and the throttle valve is completely closed, the steering-wheel-angle/yaw-rate feedback control LSD (limited slip differential) torque $T_{LSD\_P}$ ($T_{LSD\_P}=0$) for opening the transfer clutch 17 is output to the transfer-clutch control portion 83. In this case, since the transfer clutch 17 becomes open, the vehicle drive control can exert its maximum effect.

On the other hand, when the vehicle is in an oversteer condition (VDC_O=1) and the throttle value is open, or when the vehicle is in an understeer condition (VDC_O=0), the process directly exits the routine. Therefore, the clutch tightening force for the transfer clutch 17 is set using the steering-wheel-angle/yaw-rate feedback control LSD (limited slip differential) torque $T_{LSD\_P}$ set in step S16 shown in FIG. 5.

Figure 8:
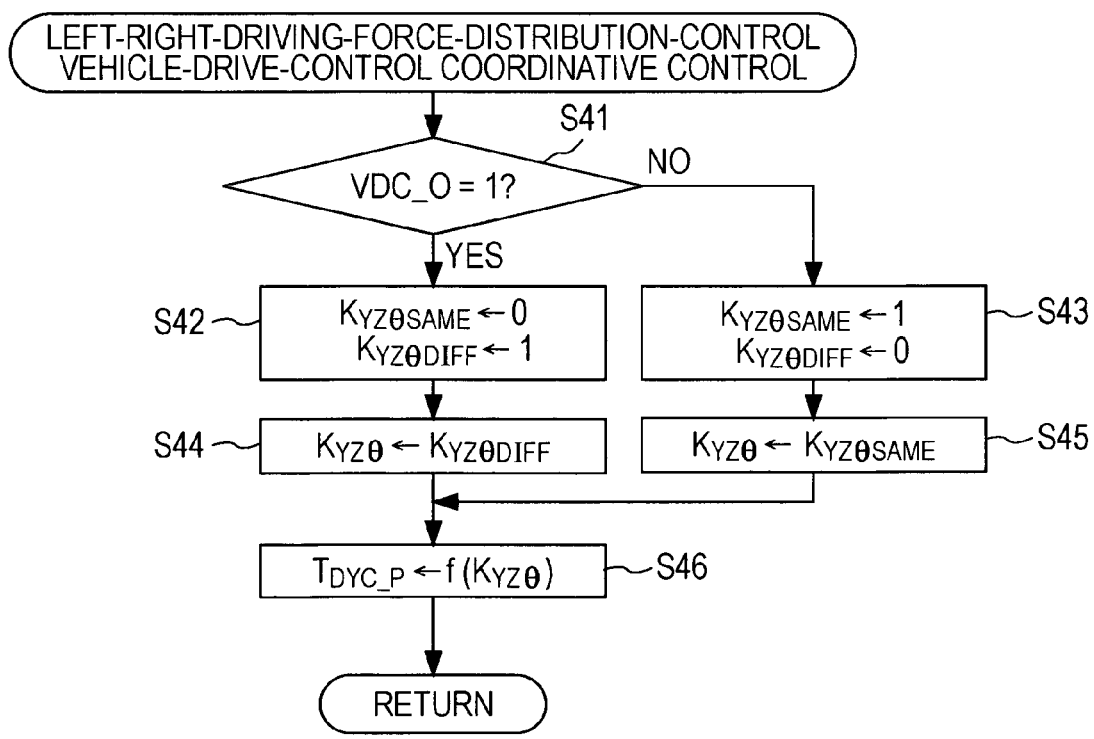
FIG. 8 is a flow chart showing a left-right-driving-force-distribution-control vehicle-drive-control coordinative control routine according to the first embodiment.

The left-right-driving-force-distribution-control vehicle-drive-control coordinative control routine shown in FIG. 8 will now be described. This routine starts with step S41 which is a step for reading the oversteer determination flag VDC_O (or the understeer determination flag VDC_U) included in the vehicle drive control operation signal input to the left-right-driving-force-distribution-control vehicle-drive-control coordinative-control setting section 89c of the left-right driving-force distribution controller 89 from the vehicle drive control unit. In this embodiment, an oversteer condition or an understeer condition of the vehicle is determined based only on the value of the oversteer determination flag VDC_O.

When an oversteer condition is determined from VDC_O=1, the process proceeds to step S42. On the other hand, when an understeer condition is determined from VDC_O=0, the process proceeds to step S43. In step S42, the understeer vehicle-speed feedback gain $K_{YZ\theta SAME}$ is set to $K_{YZ\theta SAME}=0$, and the oversteer vehicle-speed feedback gain $K_{YZ\theta DIFF}$ is set to $K_{YZ\theta DIFF}=1$. The process then proceeds to step S44. In step S44, the vehicle-speed feedback gain $K_{YZ\theta}$ is set with $K_{YZ\theta DIFF}$ ($K_{YZ\theta}\leftarrow K_{YZ\theta DIFF}$), and the process proceeds to step S46.

On the other hand, when the process proceeds from step S41 to step S43, the understeer vehicle-speed feedback gain $K_{YZ\theta SAME}$ is set to $K_{YZ\theta SAME}=1$, and the oversteer vehicle-speed feedback gain $K_{YZ\theta DIFF}$ is set to $K_{YZ\theta DIFF}=0$. The process then proceeds to step S45. In step S45, the vehicle-speed feedback gain $K_{YZ\theta}$ is set with $K_{YZ\theta SAME}$ ($K_{YZ\theta}\leftarrow K_{YZ\theta SAME}$), and the process proceeds to step S46.

As mentioned above, the understeer vehicle-speed feedback gain $K_{YZ\theta SAME}$ set by referring to the table shown in FIG. 12A is set such that the driving force distributed to the outer rear wheel is small when the vehicle is running in a low to medium speed mode. On the other hand, the oversteer vehicle-speed feedback gain $K_{YZ\theta DIFF}$ set by referring to the table shown in FIG. 12B is set such that the driving force distributed to the inner rear wheel is large when the vehicle is running in a low to medium speed mode.

Figure 15:
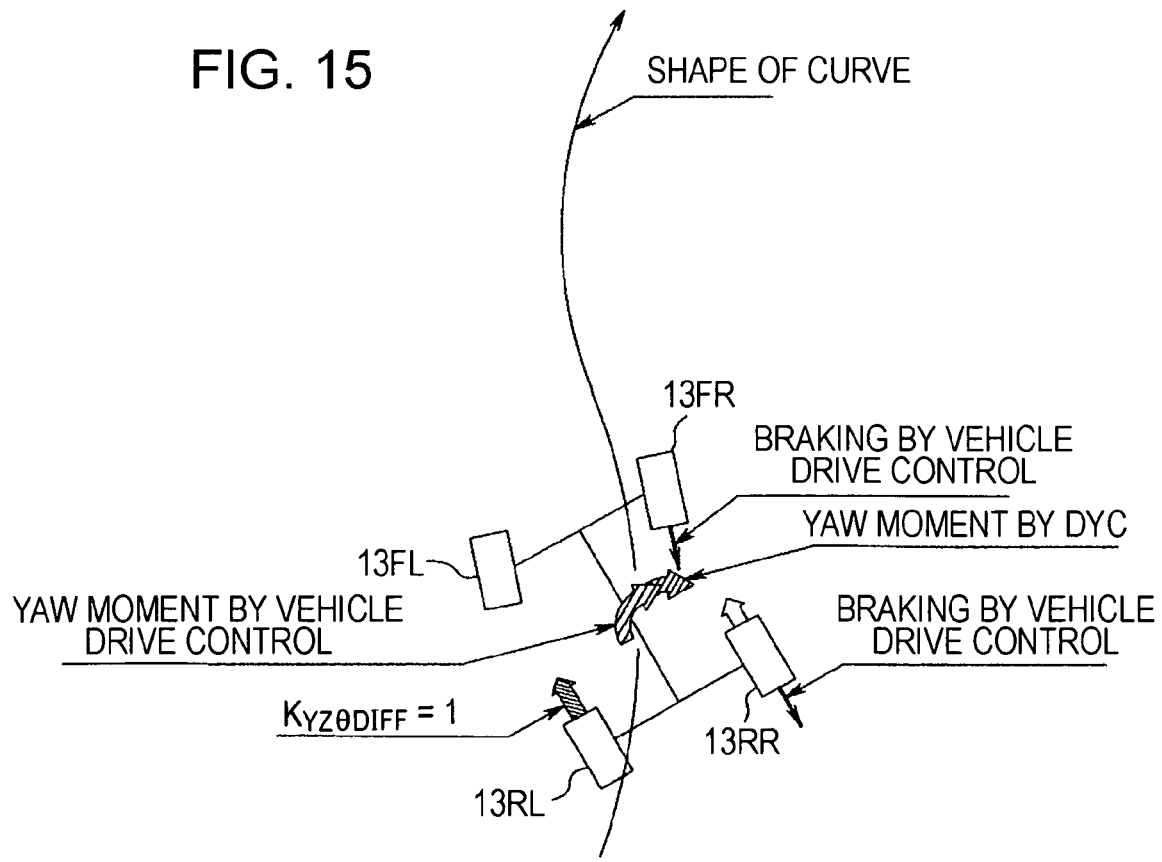
FIG. 15 illustrates coordinative control between vehicle drive control and left-right driving-force distribution control performed when a vehicle is in an oversteer condition, according to the first embodiment.

However, as shown in FIG. 14, when the vehicle is running in an understeer condition, the vehicle drive control unit performs control to apply brakes to the inner rear wheel or inner rear and front wheels so as to add a yaw moment in the turning direction. On the other hand, as shown in FIG. 15, when the vehicle is running in an oversteer condition, the vehicle drive control unit performs control to apply brakes to the outer front wheel or outer front and rear wheels so as to stabilize the behavior of the vehicle.

Consequently, in the related art where vehicle drive control and left-right driving-force distribution control are simply combined, there may be a case where the steering characteristics determined by the vehicle drive control and the direction of the additional yaw moment applied by the left-right driving-force distribution control differ from each other. In that case, the driving force distributed to the inner rear wheel becomes relatively large in an understeer condition. On the other hand, since the vehicle drive control unit applies brakes to the inner rear wheel or to both inner rear and front wheels, the driving force and the braking force interfere with each other at the inner wheels, thus lowering the understeer suppressing performance. Likewise, in an oversteer condition, the driving force distributed to the outer rear wheel is large. On the other hand, since the vehicle drive control unit applies brakes to the outer front wheel or to both the outer front and rear wheels, the driving force and the braking force interfere with each other at the outer wheels, thus lowering the oversteer suppressing performance.

In contrast, according to the first embodiment, when the vehicle drive control unit determines that the vehicle is in an understeer condition, the vehicle drive control unit limits the driving force applied to the inner rear wheel (13RL) as shown in FIG. 14, thereby preventing the driving force applied by left-right driving-force distribution control and the braking force applied by vehicle drive control from interfering with each other. In addition, since the driving force applied to the outer rear wheel relatively increases and the yaw moment by the vehicle drive control and the yaw moment by the front-rear driving-force distribution control are both added, the understeer suppressing performance can be further enhanced. On the other hand, when the vehicle drive control unit determines that the vehicle is in an oversteer condition, the vehicle drive control unit limits the driving force applied to the outer rear wheel (13RR) as shown in FIG. 15, thereby preventing the driving force applied by left-right driving-force distribution control and the braking force applied by vehicle drive control from interfering with each other. In addition, since the driving force applied to the inner rear wheel (13RL) is set relatively large and the yaw moment by the vehicle drive control and the yaw moment by the front-rear driving-force distribution control are both added, the oversteer suppressing performance can be further enhanced.

Figure 6:
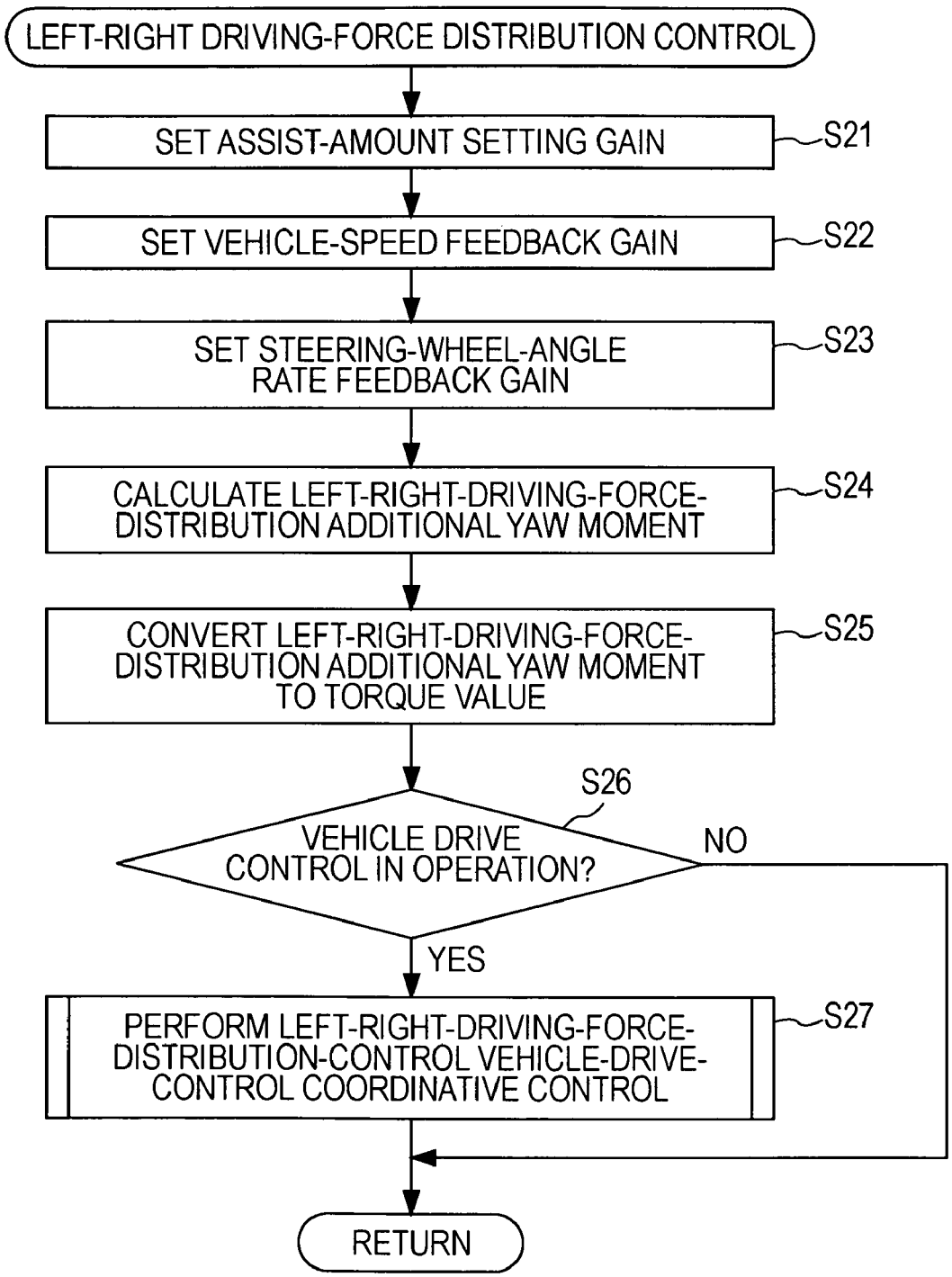
FIG. 6 is a flow chart showing a left-right driving-force distribution control routine according to the first embodiment.

When the process proceeds from step S44 or S45 to step S46, the steering-wheel-angle/yaw-rate feedback control DYC torque $T_{DYC\_P}$ set in step S25 shown in FIG. 6 is changed and set to a new steering-wheel-angle/yaw-rate feedback control DYC torque $T_{DYC\_P}$ on the basis of the vehicle-speed feedback gain $K_{YZ\theta}$ set in step S44 or S45. Subsequently, the process exits the routine.

This steering-wheel-angle/yaw-rate feedback control DYC torque $T_{DYC\_P}$ set in the left-right-driving-force-distribution-control vehicle-drive-control coordinative-control setting section 89c and the turn flag VDC_H (0: neutral; 1: right turn; −1: left turn) indicating the turning direction of the vehicle are output to the rear-control-valve control portion 82. According to the value of the turn flag VDC_H, the rear-control-valve control portion 82 outputs a corresponding left-right torque switch indication output signal to the switch valve 65 so as to allow the switch valve 65 to perform a switching operation or a neutral operation. In addition, the rear-control-valve control portion 82 outputs a hydraulic-motor pressure indication output signal corresponding to the steering-wheel-angle/yaw-rate feedback control DYC torque $T_{DYC\_P}$ to the pressure control valve 67 so as to control the amount of oil pressure to be released from the pressure control valve 67. In this manner, the oil pressure to be supplied to the hydraulic motor 40 is adjusted, whereby the left-right driving-force distribution can be controlled.

Accordingly, in the first embodiment, when the vehicle drive control is in operation, the wheel receiving the braking force applied by the vehicle drive control receives a less amount of driving force applied by the left-right driving-force distribution control. This not only prevents the additional yaw moment applied by the vehicle drive control and the additional yaw moment applied by the left-right driving-force distribution control from interfering with each other, but also prevents the braking force applied by the vehicle drive control and the driving force applied by the left-right driving-force distribution control from interfering with each other, thereby enhancing the steer suppressing performance.

When the vehicle drive control unit is performing control to suppress an understeer condition, the inner turning wheels undergo braking control as shown in FIG. 14. Therefore, with an addition of a driving force by left-right driving-force distribution control, an even greater additional yaw moment can be added. On the other hand, when the vehicle drive control unit is performing control to suppress an oversteer condition, the outer turning wheels undergo braking control as shown in FIG. 15. Therefore, with an addition of a driving force by left-right driving-force distribution control, an even greater additional yaw moment can be added.

As a result, the load on the brake system can be reduced when the vehicle drive control is in operation, so that a sense of deceleration felt by the driver can be minimized. This improves the running performance of the vehicle. Moreover, with the less amount of load on the brake system, the heating of the brakes can be reduced, thereby minimizing performance deterioration caused by overheating of the brakes. In addition, since the left-right driving-force distribution control is implemented as normal until the vehicle drive control unit starts to perform vehicle drive control, the left-right driving-force distribution control is continuously operable from the normal range to the critical range. Therefore, even in an initial state of a sideslip where the vehicle drive control is incapable of intervening because of fine controlling normally required on the brakes, a sideslip can still be minimized by the left-right driving-force distribution control, thereby allowing for high running stability. Furthermore, since the load applied on the brake system can be reduced due to less intervention frequency of vehicle drive control, weight reduction and cost reduction can both be achieved.

Figure 16:
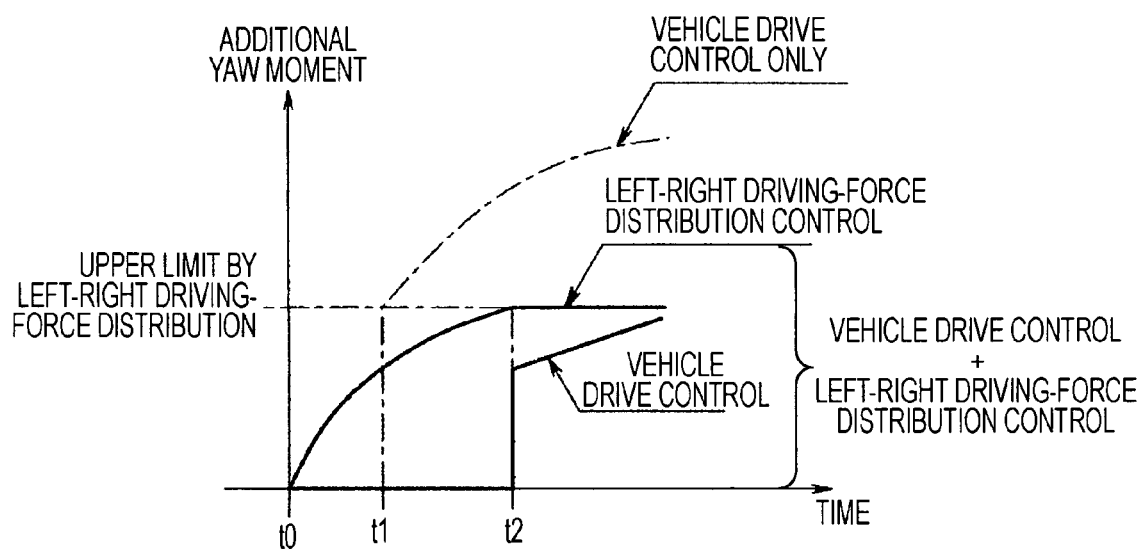
FIG. 16 illustrates an additional yaw moment generated as a result of coordinative control between vehicle drive control and left-right driving-force distribution control, according to the first embodiment.

Specifically, as compared to the related art in which an additional yaw moment is generated only by vehicle drive control as shown with a dotted-chain line in FIG. 16, the combination of vehicle drive control and left-right driving-force distribution control as shown with a solid line in FIG. 16 allows for an addition of yaw moment in each control operation. Consequently, the additional yaw moment to be generated by vehicle drive control can be relatively reduced. Moreover, since a yaw moment can be added in accordance with the left-right driving-force distribution control in an elapsed time of t1 to t2, the intervention frequency of vehicle drive control can be reduced. For an elapsed time of t2 or later, a yaw moment is added in accordance with the left-right driving-force distribution control, whereby the amount of load applied on the brake system by the vehicle drive control can be reduced by the amount of the yaw moment.

In the case where engine control for reducing the opening of the throttle valve is performed as vehicle drive control, the driving-force-distribution control unit 31 performs the same control as that described above.

Second Embodiment

FIG. 17 is a functional block diagram of a driving-force distribution control portion according to a second embodiment of the present invention. In contrast to the first embodiment described above in which the steering-wheel angle $\theta_H$ is directly detected by the steering-wheel-angle sensor 64, the second embodiment is configured such that the steering-wheel-angle sensor 64 is omitted. Specifically, instead of the steering-wheel angle $\theta_H$ being detected by the steering-wheel-angle sensor 64, a steering-wheel angle is calculated on the basis of a lateral acceleration $d^2y$ in the second embodiment.

The second embodiment will be described below by focusing only on the differences from the first embodiment. Referring to FIG. 17, a driving-force-distribution control portion 81' according to the second embodiment includes a steering-wheel-angle calculating section 64'. More specifically, the steering-wheel-angle calculating section 64' provided as steering-wheel-angle detecting means in the driving-force-distribution control portion 81' determines a steering-wheel angle $\theta_H$ from the following equation on the basis of a lateral acceleration $(d^2y/dt^2)$ (m/s$^2$) detected by the lateral-acceleration sensor 77 and a vehicle speed V (m/s) calculated by the vehicle-speed calculating section 86.

$$\theta_H = ((1 + A \cdot V^2)/V^2) \cdot L \cdot n \cdot d^2 y \qquad (10)$$

Accordingly, since the steering-wheel angle $\theta_H$ can be determined from the lateral acceleration $(d^2y/dt^2)$ in the second embodiment, the second embodiment achieves an advantage of eliminating the need for a steering-wheel-angle sensor in addition to the advantages achieved in the first embodiment. As a result, further weight reduction and further cost reduction can both be achieved.

What is claimed is:

1. A vehicle behavior control device comprising:
steering-wheel-angle detecting means configured to detect a steering-wheel angle;
yaw-rate detecting means configured to detect a yaw rate;
vehicle-speed calculating means configured to determine a vehicle speed;
sideslip prevention controlling means configured to prevent a sideslip by controlling a vehicle; and
driving-force-distribution controlling means configured to control driving-force distribution with respect to at least left and right driving wheels,
wherein the driving-force-distribution controlling means includes
additional-yaw-moment setting means configured to set an additional yaw moment to be added to the vehicle and to determine a polarity of the additional yaw moment on the basis of the steering-wheel angle, the yaw rate, and the vehicle speed, and
left-right driving-force distribution controlling means configured to set the driving-force distribution with respect to the left and right driving wheels on the basis of the additional yaw moment and the polarity of the additional yaw moment set and determined by the additional-yaw-moment setting means, and to adjust the driving-force distribution when an operation signal for sideslip prevention is output from the sideslip prevention controlling means, the driving-force distribution being adjusted such that the polarity of the additional yaw moment is in the same direction as that of a yaw moment applied by the sideslip prevention controlling means.

2. The vehicle behavior control device according to claim 1, wherein a power transmission system between front and rear wheels is provided with a differential device and a limited-slip differential device that limits a differential of the differential device,
wherein the driving-force-distribution controlling means further includes front-rear driving-force distribution controlling means configured to activate the limited-slip differential device in accordance with a running condition of the vehicle so as to set driving-force distribution with respect to the front and rear wheels, and
wherein when the operation signal for sideslip prevention is output from the sideslip prevention controlling means and throttle-opening detecting means detects that a throttle opening of a throttle valve is in a completely closed state, the driving-force-distribution controlling means cancels limitation of the differential by the limited-slip differential device.

3. The vehicle behavior control device according to claim 2, wherein the driving-force-distribution controlling means activates the limited-slip differential device in accordance with the running condition of the vehicle when the operation signal for sideslip prevention is output from the sideslip prevention controlling means, when the vehicle is in an oversteer condition, and when the throttle-opening detecting means detects that the throttle opening of the throttle valve is in an open state.

4. The vehicle behavior control device according to claim 1, wherein the steering-wheel-angle detecting means includes lateral-acceleration detecting means configured to detect a lateral acceleration, the steering-wheel-angle detecting means determining the steering-wheel angle on the basis of the lateral acceleration detected by the lateral-acceleration detecting means.

* * * * *